(12) United States Patent
Greenberger

(10) Patent No.: US 11,615,436 B2
(45) Date of Patent: Mar. 28, 2023

(54) REUSABLE CONTAINER USE INCENTIVIZING

(71) Applicant: Hal P. Greenberger, Natick, MA (US)

(72) Inventor: Hal P. Greenberger, Natick, MA (US)

( * ) Notice: Subject to any disclaimer, the term of this patent is extended or adjusted under 35 U.S.C. 154(b) by 607 days.

(21) Appl. No.: 16/396,735

(22) Filed: Apr. 28, 2019

(65) Prior Publication Data
US 2020/0342487 A1 Oct. 29, 2020

(51) Int. Cl.
*G06Q 30/02* (2012.01)
*G06Q 30/0226* (2023.01)
*B65D 25/20* (2006.01)
*G06K 19/077* (2006.01)
*G06Q 10/30* (2023.01)

(52) U.S. Cl.
CPC ....... *G06Q 30/0233* (2013.01); *B65D 25/205* (2013.01); *G06K 19/0776* (2013.01); *G06Q 10/30* (2013.01)

(58) Field of Classification Search
CPC .................................. G06Q 30/0207–30/0277
USPC .................................................... 705/14, 319
See application file for complete search history.

(56) References Cited

U.S. PATENT DOCUMENTS

| 8,561,830 | B2 | 10/2013 | Hallberg | |
|---|---|---|---|---|
| 10,021,956 | B2 | 7/2018 | Clark | |
| 2011/0114647 | A1* | 5/2011 | Hallberg | B65D 41/04 220/592.2 |
| 2011/0133947 | A1 | 6/2011 | Kraguljac | |
| 2015/0088620 | A1* | 3/2015 | Wittek | G06Q 30/0207 705/14.1 |
| 2019/0251522 | A1* | 8/2019 | Wallis | G06Q 10/087 |

\* cited by examiner

*Primary Examiner* — Luis A Brown
*Assistant Examiner* — Richard G Reinhardt
(74) *Attorney, Agent, or Firm* — Hal P. Greenberger

(57) ABSTRACT

The use of reusable containers is coupled to merchant loyalty programs. Use of a reusable container by a customer in a transaction with a merchant earns benefits in the merchant's loyalty program to incentivize use of the reusable container. Each reusable container incorporates unique identity information. The unique identity information is associated with a customer. Used reusable containers can be exchanged for reprocessed or new reusable containers, and customer associations updated when containers are exchanged. Merchants associated with different corporate entities can participate together where reusable containers can be exchanged between different corporate entities.

15 Claims, 10 Drawing Sheets

REUSABLE CONTAINER USE INCENTIVIZING

BACKGROUND

This disclosure relates to re-use of containers, and more particularly food containers such as beverage cups, bottles, bags, boxes and the like. The environmental benefits of re-using packaging are well known and understood. What has been lacking are systems that properly motivate the widespread use of such packaging. For some types of containers, a retailer or merchant may add an additional charge for a deposit on the container when the goods to be carried in the container are purchased, where the deposit is returned when the packaging is returned to a return center. Such systems have only seen limited success. The added deposit makes the purchase price of the goods appear larger to the consumer, so larger deposits are not charged. The resulting deposit amounts charged are not sufficient to motivate many customers to return the containers.

SUMMARY

All examples and features mentioned below can be combined in any technically possible way.

In one aspect, a reusable container includes a goods storage compartment, unique identifying information affixed to the container where the unique identifying information is scannable by a scanner in communication with a computing device, a structure for providing changeable marketing information, and wherein the reusable container can be reprocessed without damaging the unique identifying information or the structure for providing changeable marketing information.

Embodiments may include one of the following features, or any combination thereof. The unique identifying information is affixed to the reusable container by a method chosen from the group consisting of: adhesively attaching a label on which the unique identifying information is printed to the reusable container; sewing a label on which the unique identifying information is printed to a wall of the reusable container; and printing the unique identifying information directly on a surface of the reusable container. The unique identifying information is provided as a 2-dimensional image-based code. The unique identifying information is stored in the memory module. The unique identifying information is stored as part of an RFID tag.

The reusable container is a cup. The structure for providing changeable marketing information comprises a replaceable marketing card. A marketing compartment is attached to an exterior wall of the reusable container into which the marketing card can be removably inserted. A marketing compartment is formed between an exterior wall and an interior wall of the reusable container into which the marketing card can be removably inserted.

In one aspect, a method for incentivizing use of reusable containers includes determining by a merchant that a previously used reusable container is currently being used in a transaction by a customer with the merchant; scanning by the merchant unique identifying information that is incorporated into the previously used reusable container; verifying by the merchant that an association exists between the previously used reusable container and the customer, and attributing by the merchant to the customer a benefit in a loyalty program, where the benefit is associated with the use of the previously used reusable container in the transaction.

Embodiments may include one of the following features, or any combination thereof. Receiving by the merchant from the customer the previously used reusable container; providing by the merchant to the customer a replacement reusable container; breaking by the merchant the association between the previously used reusable container and the customer, and establishing by the merchant a new association between the replacement reusable container and the customer. Receiving by the merchant from the customer the previously used reusable container, providing by the merchant to the customer a replacement reusable container, breaking by the merchant the association between the previously used reusable container and the customer, and establishing by the merchant a new association between the replacement reusable container and the customer. Receiving by the merchant from the customer the previously used reusable container; reprocessing the received reusable container as part of the transaction, and; fulfilling in the reprocessed received reusable container an order for an item placed by the customer as part of the transaction.

Storing the received used reusable container with a plurality of previously received used reusable containers to form a plurality of used reusable containers, and; reprocessing the plurality of used reusable containers. Wherein the step of reprocessing further comprises shipping the plurality of used reusable containers to a remote facility for reprocessing.

In one aspect, a method for incentivizing use of reusable containers in mobile transactions comprising: selecting items to be ordered on a mobile computing device by a customer from a merchant; identifying by the customer that a number of reusable containers will be used in the transaction; verifying that the identified number of reusable containers are in the customer's possession by scanning unique identifying information incorporated in the reusable containers with the mobile computing device, and; placing by the customer using the mobile computing device an order with the merchant for the selected items, where placing the order involves sending information from the mobile computing device to the merchant comprising the number of reusable containers to be used by the merchant to fulfill the order.

Embodiments may include one of the following features, or any combination thereof. Fulfilling the order by the merchant, prior to the customer arriving at the merchant location, using the same number of replacement reusable containers as the number of reusable containers verified to be in the possession of the customer. Scanning by the merchant used reusable containers returned by the customer; verifying that the number of used reusable containers returned to the merchant by the customer matches the number of reusable containers scanned by the mobile computing device prior to the placement of the order; breaking by the merchant associations between the returned reusable containers and the customer, and; establishing by the merchant new associations between the replacement reusable containers and the customer. Attributing by the merchant to the customer a benefit in a loyalty program, where the benefit is associated with the use of the previously used reusable container in the transaction.

In one aspect, a method for reprocessing reusable containers includes receiving at a remote reprocessing facility used reusable containers collected from a plurality merchants, wherein at least two of the plurality of merchants are associated with different corporate entities; inspecting the received used reusable containers for damage; reprocessing the reusable containers, wherein reprocessing involves washing or cleaning the reusable containers; sorting the reprocessed reusable containers according to corporate entity, and shipping sorted and reprocessed reusable containers to facilities associated with the different corporate entities.

In one aspect, a method for reprocessing reusable containers usable with multiple corporate entities includes receiving by a merchant associated with a first corporate entity used reusable containers from customers; inspecting the received used reusable containers for damage; removing marketing cards from the received used reusable containers that contain marketing information associated with a corporate entity other that the first corporate entity; reprocessing the reusable containers, and inserting marketing cards into the reprocessed reusable containers from which marketing cards were previously removed.

Embodiments may include one of the following features, or any combination thereof. The marketing cards are removed from the used reusable containers by the merchant prior to the merchant shipping the used reusable containers to a remote facility for reprocessing.

In one aspect, a method for using reusable containers with associated gift dollars includes receiving by the merchant from a customer a first reusable container; scanning by the merchant unique identifying information incorporated into the used reusable container; verifying by the merchant if an association exists between the used reusable container and any customer; verifying by the merchant if any gift dollars are associated with the used reusable container; providing by the merchant to the customer a replacement reusable container, and if an association does not exist between the reusable container and any customer, transferring gift dollars associated with the used reusable container to the replacement reusable container.

DETAILED DESCRIPTION

Figure 1:
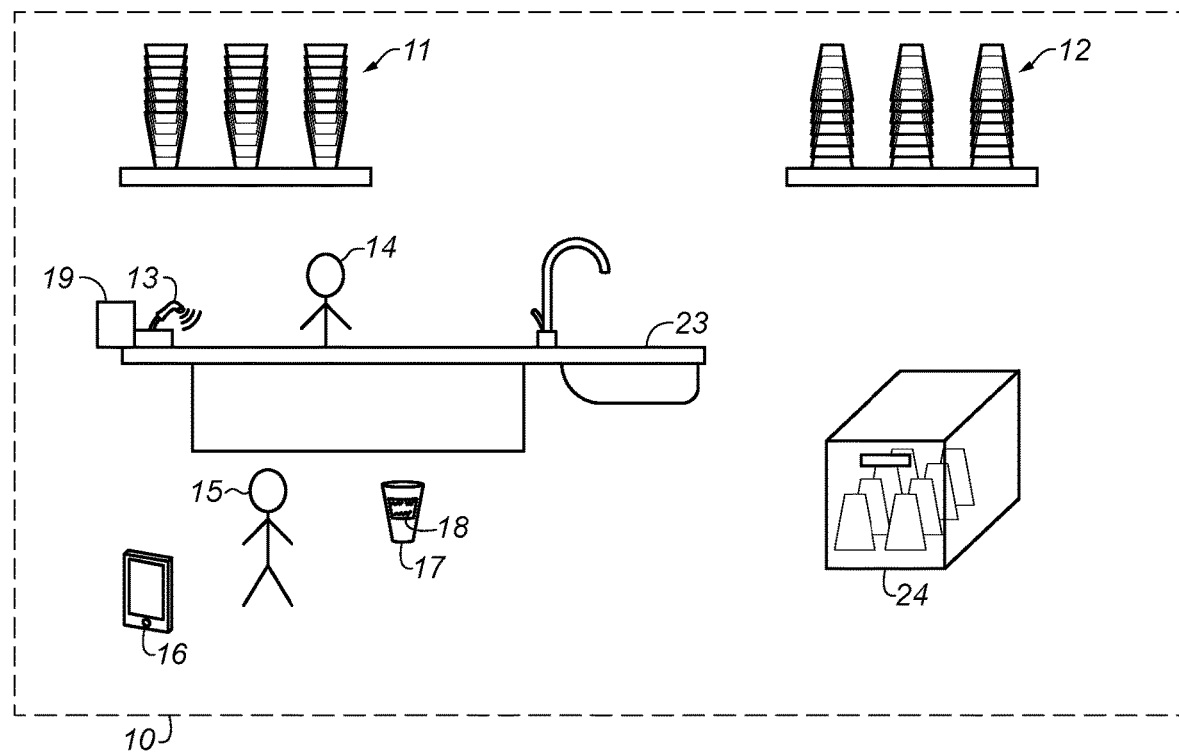
FIG. 1 depicts a merchant location where an order for goods using reusable containers can be placed and fulfilled.

US patent publication 2015/0088620 to Wittek describes a system and method for reminding users to use, and for tracking usage of, reusable container and carry products such as reusable bags, boxes, cups, cup sleeves, and bottles, especially for food and beverages. In an aspect, the system and method provide an identification module which may be attached to or embedded within a reusable container or carry product. The identification module is preferably adapted to be detected by or be operatively connect to a mobile communication device such as a smart phone, smart watch, tablet, or some other device form factor. An app provided on the mobile communication device is used to provide a schedule or location-based reminder to use the reusable product and may track usage and environmental impact for an individual user or a group of users. Promotional incentives, rewards, and pre-payment options may be provided.

Wittek fails to consider how to use reusable containers a customer may have in their possession that have not been cleaned, in a transaction with a merchant. Wittek fails to consider how to fulfill a mobile order where an order is placed by a customer and is fulfilled by the merchant before the customer is present at the merchant's location. Wittek fails to consider how marketing information from different corporate entities can be accommodated when reusable containers are used with multiple corporate entities. Wittek fails to disclose combined loyalty programs that allow reusable containers to be used with multiple different corporate entities. Wittek fails to disclose reusable containers with changeable marketing information. Wittek fails to disclose how gift dollars associated with a reusable container can be transferred when reusable containers are exchanged. Examples disclosed herein address the limitations of Wittek.

Elements of figures are shown and described as discrete elements in a block diagram. These may be implemented as one or more of analog circuitry or digital circuitry. Alternatively, or additionally, they may be implemented with one or more microprocessors executing software instructions. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Conventional operations may in some cases be omitted from the drawings.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

The environmental benefits of using reusable food, beverage and storage and transport containers such as reusable cups, bottles, shopping bags, boxes and the like, which are used to carry beverages, foods or other goods (herein after referred to as reusable containers) are well understood. However, even though the benefits are clear, widespread adoption of reusable containers has not occurred. What has been lacking is the ability to sufficiently incentivize and motivate consumers to consistently use reusable containers as part of a system that makes reusable containers easy to use and easy for merchants to accommodate. In the past, a merchant might charge a deposit for a reusable container at the time of purchase of goods, where the deposit is returned to the customer when the reusable container is returned to the merchant or a return center. One drawback to this approach is that the deposit makes the purchase price of the goods appear larger to the customer. Charging a large deposit would properly motivate customers to return reusable containers. Unfortunately, charging a large deposit also makes the goods appear substantially more expensive which can reduce sales. For this reason, deposits when charged tend to be small. The smaller deposits in many instances are insufficient to motivate return of the reusable containers.

Because currently available systems do not sufficiently motivate the desired customer behavior and/or present difficulties for merchants to implement, customers may fail to make the effort to ensure they have the reusable container with them for all purchases where the reusable container could be used, or merchants may not accept use of reusable containers because of disruption to their operation. As a result, reusable container use is substantially lower than desired.

Examples disclosed herein attempt to motivate the desired reuse behavior without negatively impacting sales (and may possibly increase sales) and without substantially impacting overall merchant margins while accommodating merchant operations. This is done by tying use of a reusable container to a reward or loyalty program (of a retailer, merchant, or manufacturer of the goods), and configuring reusable containers and tracking systems that monitor reusable container use to better fit merchant operations. While certainly there are costs to providing a loyalty program (in infrastructure, marketing, and the value of awards), such programs have been shown overall to beneficially impact sales and as a result have proliferated. Also, since many of these programs already exist, the incremental cost of adapting them to incentivize use of reusable containers is small. It has already been demonstrated that customers will alter their behavior in order to increase potential rewards from loyalty programs. This behavior can be used to motivate customers to increase their use of reusable containers. By properly configuring reusable containers and tracking systems to better fit with merchant operations, barriers to implementation are lowered.

Loyalty programs offer specific rewards or offer reward points redeemable for a range of potential rewards when a customer engages in particular actions. In most instances, these actions are purchases of goods. In one non-limiting example, a loyalty program offers a benefit or benefits to a customer for use of a reusable container. The benefits are provided when the customer uses, and the merchant confirms the use of the reusable container for a qualifying transaction. To ensure the system is not spoofed or hacked, ordering and use tracking systems ensure that available loyalty benefits for use of a reusable container are only attributed to a customer when the system can confirm that at the time a customer places an order the customer has in his possession a reusable container, and that the customer physically presents the reusable container to the merchant at some time during the qualifying transaction. One way to enable this is to require that readable or scannable unique identifying information be incorporated as part of the reusable container. The merchant confirms use of the reusable container by reading this information from the reusable container as part of the qualifying transaction. If ordering takes place remotely from the merchant location, a portion of the system confirms at the time of ordering that a reusable container is in the possession of the customer, and the merchant confirms at the time the order is provided to the customer (either picked up by or delivered to the customer) that the customer has a reusable container.

In one non-limiting example, a reusable container is associated with a customer. Use of the reusable container is tracked by the company(s) transacting with the customer. A loyalty program account of the customer is updated with information that a reusable container has been used in a transaction when such use occurs. A customer earns benefits offered through the loyalty program for use of the reusable container. In one non-limiting example, unique identity information obtained from a specific reusable container provided to a customer is scanned by a scanner in communication with a computing device controlled by the merchant, and a customer record in a database maintained or controlled by the merchant is updated with the reusable container unique identifying information, to form an association between the customer and the reusable container. In one non-limiting example, a software application supplied by the merchant that runs on a computing device used by the customer, such as a smartphone owned by the customer, is used to read or scan unique identifying information from the reusable container. In one non-limiting example, the customer's computing device may upload this unique identifying information to a merchant-controlled computing device where it is added to a customer record that resides in a database controlled by the merchant, to form the association. In one non-limiting example, the customer's computing device may maintain the information locally, where this information can be queried as needed by merchant systems as part of a transaction, to confirm the customer has an associated reusable container. In one non-limiting example, the unique identifying information is uploaded to a 3rd party-controlled computing device where a customer record is maintained on a 3rd party database, where the 3rd party database is queried as part of a transaction or merchant operation. The data related to an association may also be stored in more than one location simultaneously for increased reliability and robustness of system operation.

A customer can inform a merchant that they wish to participate in a loyalty program, and that they further wish to qualify for rewards offered for use of a reusable container. The merchant signs the customer up for their loyalty program (if the customer is not currently a member). A specific reusable container can be associated with the customer. An initial fee may be charged to cover the cost of supplying an initial reusable container to the customer, or a merchant may choose to waive such a fee. In one non-limiting example, the merchant can choose to waive the initiation fee if the reusable container is used a predetermined number of times or if the reusable container is used a predetermined number of times over a predetermined time period. Alternatively, an initial fee may be charged but a first benefit can be offered for use of the reusable container that is more attractive than benefits offered on an ongoing basis, to incent the customer to join the program. Merchants are free to determine how they wish to drive initial adoption of reusable containers. An initiation fee can be charged for each reusable container a customer wishes to obtain. For example, a customer may wish to have more than one reusable beverage container at a time (to use for a friend or family member), or more than one reusable carrying bag for groceries.

In one non-limiting example, unique identifying codes are applied to individual reusable containers. The codes can be unique codes that have no relationship to customers until a relationship is established by the merchant, or the codes could include account information that has been previously associated with customers. Unique identifying codes that are not customer specific can be manufactured and distributed in bulk without requiring access to any merchant loyalty program databases keeping customer information more secure. Most of the following discussion assumes that each reusable container contains a unique identifying code that is not associated with a customer until a merchant specifically creates an association at the time of a transaction with a customer and the reusable container. As long as an association between a reusable container and a specific customer can be made, a loyalty program can track use of the reusable container by the customer.

In one non-limiting example, the identifying codes are unique, alphanumeric non-sequential codes. At the time a specific reusable container is provided to a customer, the unique code of that reusable container is associated with that customer. The association is maintained in a database coupled to, in communication with, integral to or otherwise accessible to the merchant. For example, the association may be maintained as part of a database storing information associated with a merchant loyalty program. As long as this association is maintained, any use of the reusable container will be attributed to that customer and will contribute to any benefit offered by the loyalty program earned by that customer.

Reusable containers are reprocessed so they can be reused to fulfill new orders form customers. Reprocessing can be done locally at a merchant's establishment, either as part of a transaction or off line from fulfilling transactions. Reprocessing can also be done offsite by a 3rd party. Reprocessing of reusable containers involves cleaning the containers so that they can be reused by a merchant for fulfilling customer orders. Reprocessing may involve washing or cleaning. In some examples, reprocessing may also involve inspection to make sure the reusable containers are in good condition, checking that identifying information associated with the reusable containers is readable or scannable as required, and ensuring the reusable containers incorporate the correct marketing information for the company or merchant that will use them to fulfill new customer orders. Use of reusable containers across different corporate entities who may have different marketing information (such as logos, slogans and the like) is discussed in more detail in a later section.

If a reusable container associated with a customer is returned to a merchant and maintained in the merchant's possession after a transaction with the customer is complete (e.g. it is not reprocessed and returned to the customer as part of the same transaction), the association of that specific reusable container with the customer is intentionally broken. If at a later date that same reusable container is provided to a new customer after the used reusable container has been reprocessed (washed/cleaned etc. as described earlier), it is associated with the new customer at the time it is provided to the new customer. Any benefits earned from further use of the reprocessed reusable container will then be attributed to the new customer, until such a time as this container is again returned to the merchant for another reprocessing and swapping cycle.

Allowing associations for a unique reusable container to be switched to different customers enables reusable containers to be easily swapped at the time of purchase. When a customer presents a used reusable container to the merchant as part of a transaction, the merchant scans the reusable container to obtain the unique identifying code. In one non-limiting example, the merchant receives the used reusable container from the customer and fulfills an order from the customer with a replacement reusable container. The transaction information as well as an acknowledgement of the use of the reusable container in the transaction is attributed to the customer within the merchant's loyalty program, and benefits are earned as determined by the loyalty program. The association of the returned reusable container with this customer is then broken and the reusable container is taken into inventory of the merchant for reprocessing. As part of completing the transaction, the merchant establishes an association between the replacement reusable container and the customer. All further transactions with this new reusable container are then attributed to the customer until such a time as this association is broken (as would happen if the new reusable container was again swapped as part of a new transaction).

Allowing reusable containers to be swapped at the time of purchase avoids the need for the customer to wash/clean the reusable container before it can be re-used. It is convenient for the customer to store their reusable container in their vehicle, so it is readily available. If the customer is required to clean their reusable container before it can be used as part of a transaction (for example, re-usable cups used for a beverage like coffee or soda must be cleaned before use), the customer might leave their re-usable container at home after cleaning and would not have it available at the time of their next purchase. This could negatively impact usage rates of reusable containers and is undesirable. Allowing swapping of reusable containers reduces the chances that the customer's reusable container is inadvertently left at home and is unavailable for use.

A merchant can choose how to handle a situation where a customer has a reusable container associated with them but does not have it in his possession at the time of a transaction. The merchant could just issue another reusable cup to the customer, but this increases merchant costs as it would increase the number of reusable cups that must be kept in circulation to service a customer base. Merchants could give the customer a period of time to return the extra reusable container before a fee is charged, or they might charge a fee that is refundable when the additional reusable container is returned. This fee, unlike prior art deposits can be made significant enough to motivate the customer to promptly return the extra reusable container, as these fees would only rarely be charged.

Of course, if the customer chooses, they can use their re-usable container for whatever purposes they wish and wash it themselves as needed. A customer could provide a used reusable container to the merchant that the customer has washed so it can be used in the current transaction, eliminating the need to swap reusable containers and alter associations. However, by providing swapping of reusable containers and controlling the associations of reusable containers with customers, customer washing of containers is not required.

In one non-limiting example, the merchant can reprocess a used reusable container as part of the current transaction, at the time of the transaction. For example, for an "in location" transaction, the merchant can receive the used reusable container, reprocess it, and then use it to fulfill the customer's order. This also eliminates the need to swap reusable containers and modify associations.

The unique, alphanumeric non sequential codes may be generated by a 3rd party and provided to participating corporate entities. In one non-limiting example, entities acquire codes from the 3rd party in bulk, and each entity's will only have access to its own codes. Companies will not know the codes acquired by other companies.

In one non-limiting example, unique codes are supplied by the 3rd party to a reusable container manufacturer and the manufacturer incorporates the codes into reusable containers. In one non-limiting example, the reusable container manufacturer is also the supplier of the unique identifying codes.

The 3rd party and/or the reusable container manufacturer (if they are different entities) can maintain a database of all codes generated, as well as a list of codes provided to each participating corporate entity, and the database can be queried as part of a transaction at any participating corporate entity merchant location to determine if codes are valid (a valid code is a code that was issued by the party providing codes). It should be noted, though, that it is not required to check that a code is valid since reusable containers will be associated with customers. As long as the reusable container used by a customer is associated with that customer (which the merchant checks as part of the transaction), loyalty program benefits can be attributed to the correct customer. However, the benefit to determining that a code is valid is that a stolen or otherwise non-conforming reusable container can be more easily flagged.

A reusable container should be washable or sufficiently cleanable so that merchants can be assured their customers are receiving reusable containers that are free from contamination. Some merchants may wish to ensure reusable containers are properly cleaned and may only allow use of reusable containers that the merchant or its designated vendor have reprocessed (washed/cleaned). In one non-limiting example, a unique identifying code is applied to the reusable container in a sufficiently robust manner such that the identifying code can withstand a desired number of wash and clean operations. Alternatively, in one non-limiting example, a new code can be applied each time the reusable container is reprocessed.

In one non-limiting example, a merchant could choose to install a bulk reprocessing system at each merchant location. When a sufficient number of used reusable containers are received by the merchant at a specific location, the reusable containers are bulk reprocessed (washed/cleaned) and returned to inventory for re-use.

In one non-limiting example, a merchant could choose to package together bulk reusable containers and send them to a remote party for reprocessing. The remote party may be part of or owned or controlled by a merchant company or may be an independent 3rd party. The remote party may be the same party that issues the unique codes or may be a different party. Remote reprocessing operations could be established regionally and receive and distribute reusable containers from/to a large number of merchants located within the region. Regional remote reprocessing is described in more detail in a later section in relation to a reusable container system designed to work with more than one corporate entity having multiple merchant locations (for example, to work simultaneously with Starbucks and McDonalds, or additional companies). A remote reprocessing center receives bulk used reusable containers, reprocesses them as needed, packages them as needed and ships reprocessed reusable containers back to merchants or corporate distribution facilities based on merchant or corporate requirements.

In one non-limiting example, a merchant could choose to install an in-line reprocessing system at each merchant location. A wash operation could be incorporated into the merchant order fulfillment process so that when a reusable container is received from the customer, it is washed, goods are added and the reusable container is returned to the customer as part of a single transaction. This process flow eliminates the need to swap reusable containers and the requirement to break and establish associations of reusable containers with customers as part of each transaction. However, a customer may desire at some point to swap the reusable container if it becomes damaged, or a merchant will want to swap it if the identifying information becomes unreadable. Performing in-line reprocessing does not preclude swapping of reusable containers. Also, in-line reprocessing is not compatible with mobile ordering as mobile orders are typically fulfilled by the merchant before the customer arrives at the merchant location.

In one non-limiting example, unique identifying codes are printed on labels applied to reusable containers. The labels should be permanently affixed to the reusable containers. The labels contains codes which can be optically scanned, such as a bar code, a QR code or other 2D image-based code. The labels may be coated with a polymer material capable of withstanding multiple wash/cleaning cycles. Alternatively, unique identifying codes could be printed directly on a surface of the reusable containers. One example of unique codes are the codes used in the Amazon Transparency program recently introduced by Amazon to reduce counterfeiting. The Amazon Transparency system uses unique, alphanumeric non-sequential codes in the form of 2D images that are printed on labels which are added to products and are similar to the labels described here.

In one non-limiting example, a label containing a unique identifying code is replaced every time a reusable container is reprocessed (washed/cleaned) by the merchant or a remote reprocessing center. The new label can use a completely new unique code. If a new code is used every time a reusable container is reprocessed, the association of the old code with a customer need not be broken as the old code will no longer be used.

In one non-limiting example, a unique identifying code is printed onto a portion of the reusable container as part of the container's manufacturing process, or as a separate operation. The printing is sufficiently robust so that it will last through a desired number of reprocessing (wash/clean) cycles. The unique identifying code may be printed on a surface of the reusable container protected by an optically transparent protective layer, so the printed area is not exposed to the reprocessing operation, where the transparent layer does not interfere with optical scanning of the code.

In one non-limiting example, a merchant can supply a label containing a unique identifying code to a customer for the customer to use with their own, existing reusable container. Some customers may have a more expensive or a preferable reusable container they wish to use. The customer may avoid paying an initiation fee if they supply their own reusable container. Merchants can provide a label for such containers such that they can be used as part of the loyalty program if merchants wish to enable this capability. Since these reusable containers are likely non-standard, a customer may be required to wash/clean their own reusable containers rather than turn them into the merchant for reprocessing. For liability purposes, a customer using such a reusable container, if it comes in direct contact with food or beverages (as for example a beverage cup), may be required to specifically acknowledge that they have cleaned their container and are responsible if any issues of contamination arise.

Use of an image based unique identifying code allows the code information to be optically scanned which is useful when a mobile transaction is involved, as most mobile devices are equipped with a camera that can function as an optical scanner with associated software. There are a number of optical scan applications available to use with various smartphones, and such applications can be incorporated as part of a merchant's loyalty or mobile ordering application. This is described in more detail later. However, it should be noted that example reusable containers disclosed herein are not limited to use of imaged based codes. Example reusable containers disclosed herein may store a unique identifying code on a magnetic stripe, in an RFID tag, in an integrated circuit chip having memory, or in any other known information storage device that is incorporated into the reusable container. Information storage devices can be active or passive. Memory devices may be ROM, RAM, flash, or other known memory types. Information storage should be non-volatile so the information is not easily lost, though a battery could be used if desired to keep volatile memory refreshed. Stored information can be transmitted to a reading device using known transmission methods such as optical, RF, IR, ultrasonic, capacitive, inductive, or any other known information transmission technology. Any known information transmission protocol can be used to transmit such information such as Bluetooth, Bluetooth LE, NFC, etc. Examples disclosed herein are not limited in the information encoding used, in the transmission method used or the information storage method used. However, use of a image based code that can be optically scanned is particularly useful because merchants typically already have laser based bar code scanners in communication with computing devices controlled by the merchant which can also scan 2D image based codes. Customer mobile computing devices such as smartphones also have cameras that can be used with associated software to perform an optical scan. Using an image-based code is also beneficial because printed labels in high volume can be quite inexpensive.

A reusable container may incorporate any known type of rewritable memory which can accept new information. At the time of purchase, unique identifying information can be written into the memory of the reusable container, and an association between the reusable container and the customer is then made in a merchant database. In one non-limiting example, an account number associated with the customer is written into a memory device of the reusable container. In this instance, the association of the reusable container with the customer is direct rather than relational where a cup identifier is associated with customer in the loyalty program database. Functionally, the result is the same in that the reusable container is associated with the customer as long as that container is in the customer's possession. However, if customer specific information is written into the reusable container memory device, when the reusable container is swapped for reprocessing by a merchant, the customer account information must be wiped so that further transactions with this reusable container will only associated with a new customer the container is subsequently provided to after reprocessing, not the old customer. This requires erasing and writing in memory, or overwriting memory of the reusable container. In this example, information on the container must change, whereas in previous examples only information in a remote program database was changed—the unique identifying information on the reusable container was not altered.

A reusable container that incorporates a unique identifying code may be used as a gift card. A customer can purchase a reusable container. At the time of purchase, the customer can inform the merchant of a dollar amount they wish to associate with the reusable container. When the transaction is completed, the requested dollar amount is associated with the unique identifying code of the reusable container in a merchant database. This database may be part of a loyalty program database or may be separate. The reusable container can function in the same manner as existing gift cards. A customer can inform a clerk that they wish to pay for a transaction with their "reusable container". The reusable container is scanned by the merchant and the dollar balance associated with the container is updated with the new transaction information.

If a dollar balance is associated with the unique identity code of a reusable container that is to be swapped out for a replacement reusable container as part of a merchant transaction, the dollar balance must be transferred from the old reusable container to the replacement reusable container. The POS system of the merchant as part of the transaction will update its database to transfer the association of the dollar balance from the unique identity code of the returned reusable container to the unique identity code of the replacement reusable container. This transfer is needed if the reusable container has not been associated yet with a particular customer.

If the reusable container with an associated dollar amount is subsequently associated with a customer (for example, as part of a merchant loyalty program sign up, or the reusable container is given to a customer that already has an account with the merchant), the dollar balance associated with the reusable container can then be associated with the customer and added to any other account balances the customer may have. Once a balance has been transferred to a specific customer account, it can be maintained and accessed in whatever manner the merchant has set up for such accounts. The dollar balance can but need not remain tied to the reusable container.

Figure 2:
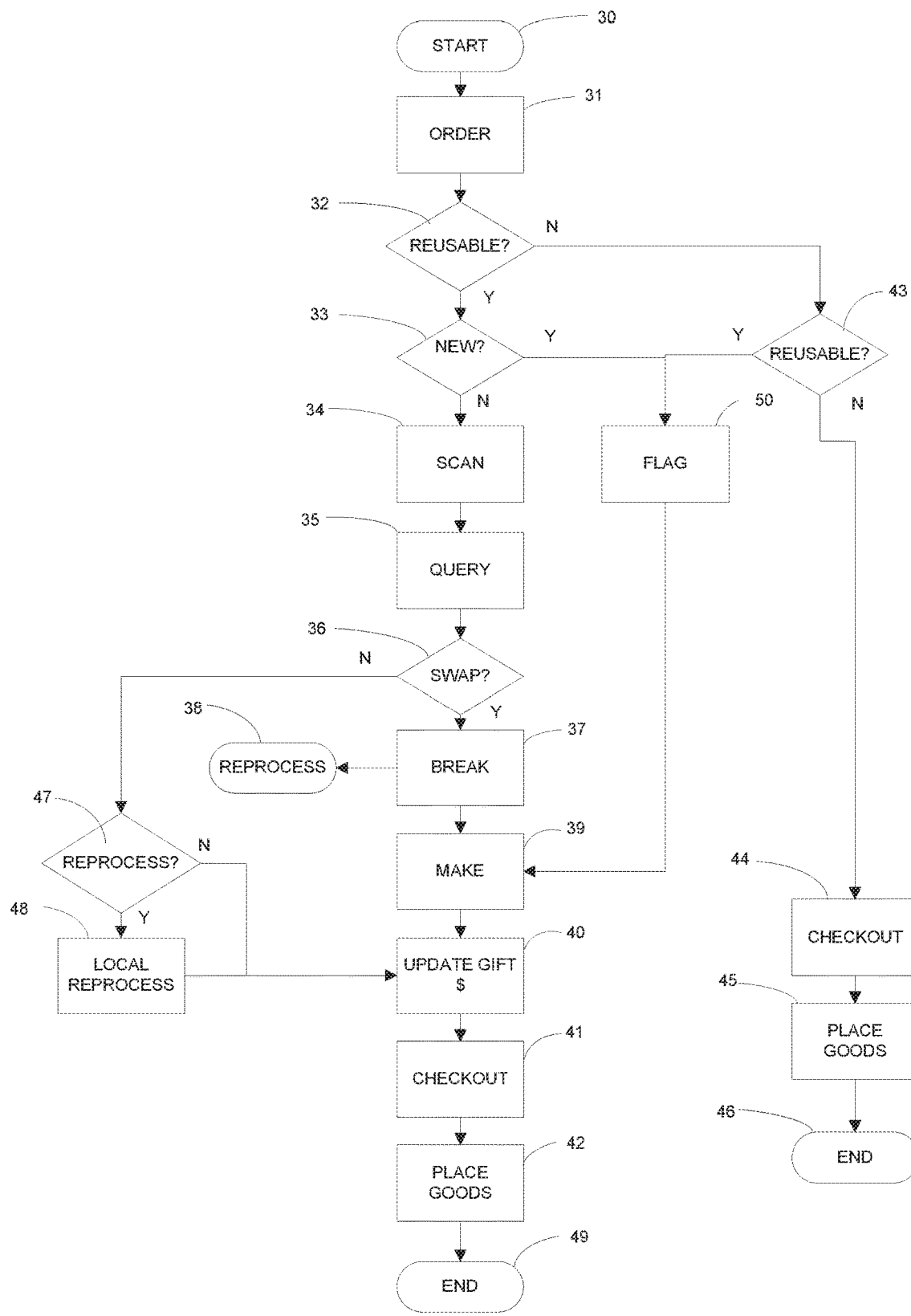
FIG. 2 is a flowchart depicting the steps in a transaction for goods using a reusable container at a merchant location.

Turning now to FIGS. 1 and 2, FIG. 1 depicts a merchant operation for processing in-person counter transactions where a corporate entity loyalty program provides rewards for use of reusable containers by customers. FIG. 2 depicts a flow chart showing steps in a typical customer transaction with the merchant of FIG. 1. FIG. 2 is concerned with a transaction involving only a single reusable container. However, the steps shown can be repeated as needed if more than one reusable container will be used.

Referring to FIG. 1, customer 15 wishes to engage in a transaction at merchant location 10. Customer 15 places an order with clerk 14. Customer 15 possesses a reusable container 17, which is depicted as a cup but can be any type of reusable container. Reusable container 17 incorporates unique identifying information, which is shown in FIG. 1 as label 18 with a 2D image code. Customer 15 may or may not have a smart device 16 which may be a smart phone, a tablet or other electronic smart device.

Next to clerk 14 is a scanning device 13, which in FIG. 1 is depicted as an optical scanner but may also be any other known scanning device (RF, optical, IR, capacitive, inductive, etc.) capable of reading the unique identifying information from reusable container 17 (from label 18 or from any other memory or information storage device or processor which may be present in reusable container 17 capable of storing unique identifying information). Scanner 13 is coupled to a computing device controlled by the merchant such as point of sale (POS) terminal 19. POS terminal 19 is capable of communicating with remote computing location 20 which houses one or more remote computing devices, such as servers 21 and 22. Servers 21 and 22 store, process and communicate information related to the merchant loyalty program. Servers 21 and 22 may store loyalty program information in a database that runs on the servers and may process and communicate other merchant transaction related information.

Within convenient access to clerk 14 is inventory of reusable containers 11 ready for use. Also within convenient access to clerk 14 may be stock 12 of used reusable containers which have been received previously from other customers. Used reusable containers may be stored as stock 12 until enough units are present for performing a bulk reprocessing operation. Merchant location 10 may include bulk reprocessing device 24, which is depicted as a dishwasher in FIG. 1, capable of reprocessing (washing or cleaning) a large number of reusable containers simultaneously. Merchant location 10 may have an in line reprocessing device 23, which in FIG. 1 is depicted as a sink, which is constructed and arranged to reprocess (wash/clean) individual reusable containers.

In one non-limiting example, merchant 10 may ship the stock 12 of used reusable containers to remote reprocessing facility 25 for reprocessing, and remote reprocessing facility 25 may ship reprocessed units back to merchant 10. Shipping of reusable containers between merchant location 10 and remote reprocessing facility 25 is illustrated by bi-directional arrows 26. Merchants may ship reusable containers directly to reprocessing facility 25 or to a corporate distribution center for aggregation, where the distribution center then ships reusable containers to reprocessing facility 25. Reprocessing facility 25 may ship reprocessed reusable containers directly to individual merchants as shown or may ship reprocessed reusable containers to corporate distribution centers who in turn ship reprocessed reusable containers to merchant locations.

FIG. 2 depicts a flowchart depicting steps in a transaction between customer 15 and merchant 10. A transaction begins at step 30. At step 31, customer 15 informs clerk 14 which goods he wishes to order. At step 32, clerk 14 determines if customer 15 possesses a reusable container that will be used. If customer 15 has a reusable container, for example reusable container 17, customer 15 presents reusable container 17 to clerk 14. At step 33, clerk 14 determines if the reusable container presented by customer 15 is new or used. (Though the flowchart of FIG. 2 shows a separate check block 33 for determining if the reusable container is new or used, this need not be an explicit step and could be incorporated into scanning step 34 and/or database query 35, as the merchant POS systems and databases track use of reusable containers and would be able to tell if a container had been used in a previous transaction or not.) Customer 15 may obtain a new container from a display within the merchant's establishment 10, or customer 15 may have a reusable container in his possession when entering merchant location 10. If a used reusable container is presented by the customer, the transaction proceeds to step 34. If a new reusable container is presented by the customer, the transaction proceeds to step 50, which is described below. At step 34 the reusable container is scanned and the unique identifying information from the reusable container is obtained (for example, by scanning a 2D image code on label 18 with optical scanner 13).

At step 35 a database is queried to see if this reusable container has a current customer and/or any gift dollars associated with it. POS system 19 receives the unique identifying information from scan 34 and queries a database stored on a server owned or controlled by the merchant, such as remote servers 21 or 22, to see if any association has previously been made between container 17 and a customer, or if any gift dollars are associated with reusable container 17. If reusable container 17 was previously used by a customer, clerk 14 checks to see that reusable container 17 is currently associated with customer 15. If gift dollars are associated with reusable container 17, clerk 14 will inquire if customer 15 wishes to couple those dollars to customer 15's account (if they are not currently associated with customer 15's account). Customer 15 may have received reusable container 17 as a gift loaded with gift dollars and may not have a customer account with the merchant or may not have previously transferred gift dollars associated with reusable container 17 to his account.

At step 36, clerk 14 determines if reusable containers are to be swapped. A swap may not be done if, for example, the merchant location locally reprocesses used reusable containers presented at the time of transactions by using an in-line reprocessing device such as sink 23 (along with inspecting the reusable container, ensuring identifying information scans properly and the container incorporates the merchant's marketing information), or if the reusable container presented is not standard and does not fit with merchant 10's reprocessing operation. For example, customer 10 may have a special insulated thermos he wishes to use for beverages that the merchant 10 is not set up to reprocess. If a swap is not performed, the transaction proceeds to step 47.

At step 47, it is determined whether or not to in-line reprocess the reusable container 17 presented by customer 15 that was not swapped. If the container 17 can be in-line reprocessed and merchant 10 has in-line reprocessing capability, container 17 is reprocessed at step 48 and the transaction proceeds to step 40. If customer 15 has cleaned container 17 prior to entering merchant 10 location, then local reprocessing is skipped and the transaction proceeds to step 40.

Returning to step 36, if it is determined that a swap is to be done, the transaction proceeds to step 37. At step 37 the association of container 17 with customer 15 is broken and reusable container 17 is placed into stock 12 of previously used containers, for later reprocessing at step 38. Also, at step 37 clerk 14 procures a replacement reusable container from current inventory 11 of reusable containers (which may either be new or reprocessed). At step 39 clerk 14 creates a new association between the replacement reusable container and customer 15.

In step 40, if in the earlier database query at step 35 it was determined that gift dollars were associated with reusable container 17 and a replacement reusable container was issued, the association of those dollars is transferred from container 17 to the replacement reusable container. If reusable container 17 had associated gift dollars and it was not swapped for a replacement container, clerk 14 will inquire if customer 15 wishes to increase the gift dollar amount associated, if the customer wishes to associate the gift dollars with their customer account if they are not currently associated with the customer, and if the customer wishes to pay for their order using the associated gift dollars. If the reusable container is new and is not associated with a customer, clerk 14 will ask customer 15 if he wishes to add any gift dollars to the new reusable container.

At checkout step 41, the financial transaction is completed and payment is made. Payment can be made by whatever method merchant 10 accepts, including using gift dollars associated with a reusable container. Also, at this time the loyalty program database is updated with information related to the transaction. Any benefits offered by the loyalty program related to the transaction are attributed to the customer at this time, including but not limited to benefits offered for use of reusable containers. At step 42, an item is placed into the replacement reusable container and the transaction ends at step 49. Note that goods could be placed into reusable containers before checkout if desired.

Returning to step 33, if customer 15 presents a new reusable container to clerk 14 that customer 15 obtained from a display at merchant 10's location, it is assumed that the new reusable container has no associated customers or dollar amounts, so scanning, swapping and reprocessing steps are not necessary. At step 50 the provision of a new reusable container is flagged so appropriate charges for the reusable container (if any) can be made at checkout, and the transaction proceeds to step 39. From step 39, the transaction proceeds as described earlier.

Returning to step 32, if the customer has not presented a reusable container to clerk 14, at step 43 clerk 14 inquires if customer 15 wishes to use a reusable container. If the answer is yes, clerk 14 procures a new reusable container from stock 11 and the transaction moves to step 50 and proceeds as before. If customer 15 declines to use a reusable container, the transaction proceeds to checkout step 44 where the financial transaction is completed and payment is made. Payment can be made by whatever method merchant 10 accepts, including using gift dollars associated with the customer account. Also, any benefits offered by the loyalty program related to the transaction are attributed to the customer at this time, and the customer account in the loyalty program database is updated accordingly. At step 45, goods are placed into a disposable container or containers and the transaction is completed. Since no reusable container was involved in the transaction, no rewards associated with use of a reusable container will be attributed to the customer for this transaction.

Unlike an in-person transaction, at the time a mobile order is placed, the customer is not present at the merchant's location. A customer enters an order on a mobile computing device (such as a smartphone) running a merchant application or via a merchant's website. Mobile transactions are completed (except for the pickup of the goods) prior to the customer entering the merchant's location. The merchant does not have access to reusable containers in the possession of the customer when the order is placed. The merchant cannot physically scan the customer's reusable containers at the time of the order to confirm that the customer possesses reusable containers. In-line reprocessing of a customer's used reusable container is not practical as mobile orders are fulfilled prior to the customer arriving at the merchant location. The merchant would have to wait until the customer arrives at the merchant location, receive the reusable container from the customer, reprocess it (wash, inspect, scan and check marketing information) before fulfilling the order, losing the time benefits of mobile ordering.

The merchant fulfills the mobile order using a number of replacement reusable containers that matches (or exceeds) the number of reusable containers specified as part of the order and verified to be in the customer's possession (the customer may wish to add additional reusable containers so the number of containers used by the merchant to fulfill the order could be larger than the number of verified reusable containers currently in the customer's possession). The merchant supplied reusable container(s) are swapped for the reusable container(s) in the customer's possession when the customer picks up their mobile order. The mobile ordering system confirms as part of the order process the number of reusable containers in the customers possession at the time of ordering, and communicates this information to the merchant when the order is placed (along with other relevant transaction information) so the merchant can fulfill the order with the proper number of replacement reusable containers. This minimizes the chances the merchant inadvertently provides a replacement reusable container when the customer does not have an existing reusable container to swap.

When a mobile order is placed in a mobile ordering system where usage of reusable containers is incentivized as part of a loyalty program, the ordering system asks the customer to specify how to fulfill individual items in the order, and also may ask how to fulfill the order in total for the case where use of reusable carry bags are incentivized. The ordering system asks the customer to specify which items being ordered should be provided in reusable containers. The mobile ordering system may ask the customer to update selections if it does not verify that the customer has in his possession the selected number of reusable containers. The mobile ordering system may further ask the customer to specify other details about the containers to be used as needed (such as type, size). For example, the customer may specify they have a specialty or limited-edition reusable container in their possession. Of course, the mobile ordering system performs other functions that are standard in mobile ordering systems, and those functions will not be described in detail here as they are well known.

Figure 3A:
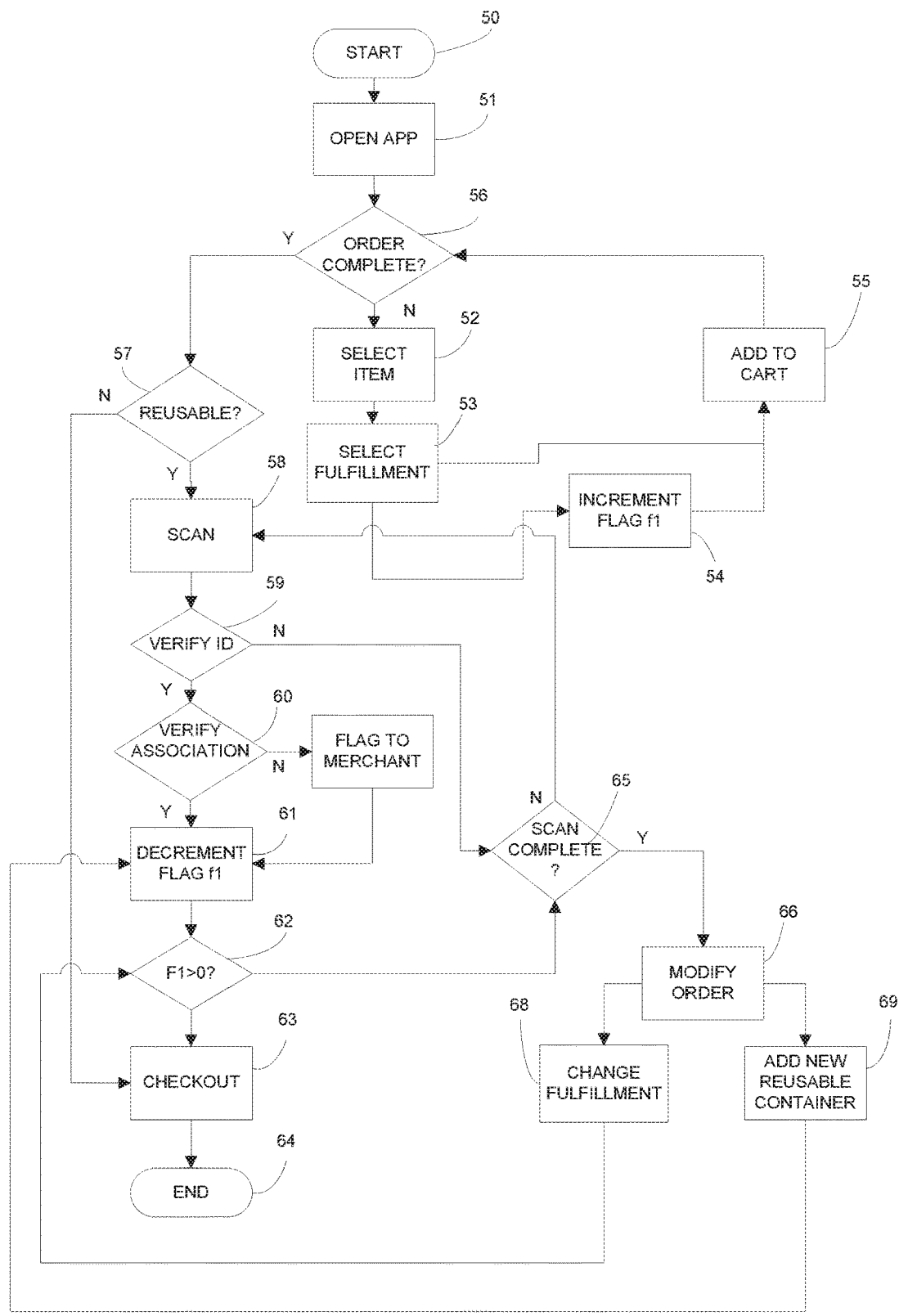
FIG. 3A is a flowchart for a first part of a mobile order process for goods fulfilled with a reusable container performed by a customer.
Figure 3B:
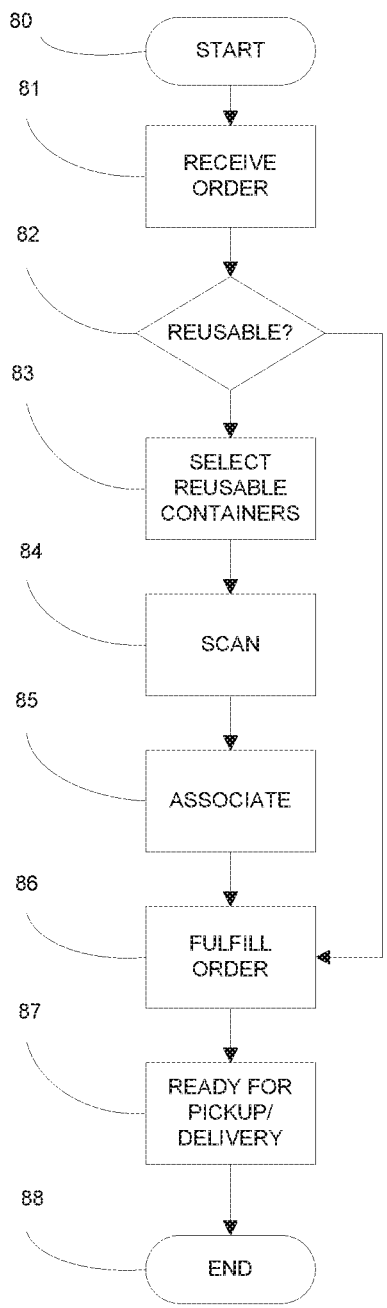
FIG. 3B is a flowchart for a second part of a mobile order process for goods fulfilled with a reusable container performed by a merchant.
Figure 3C:
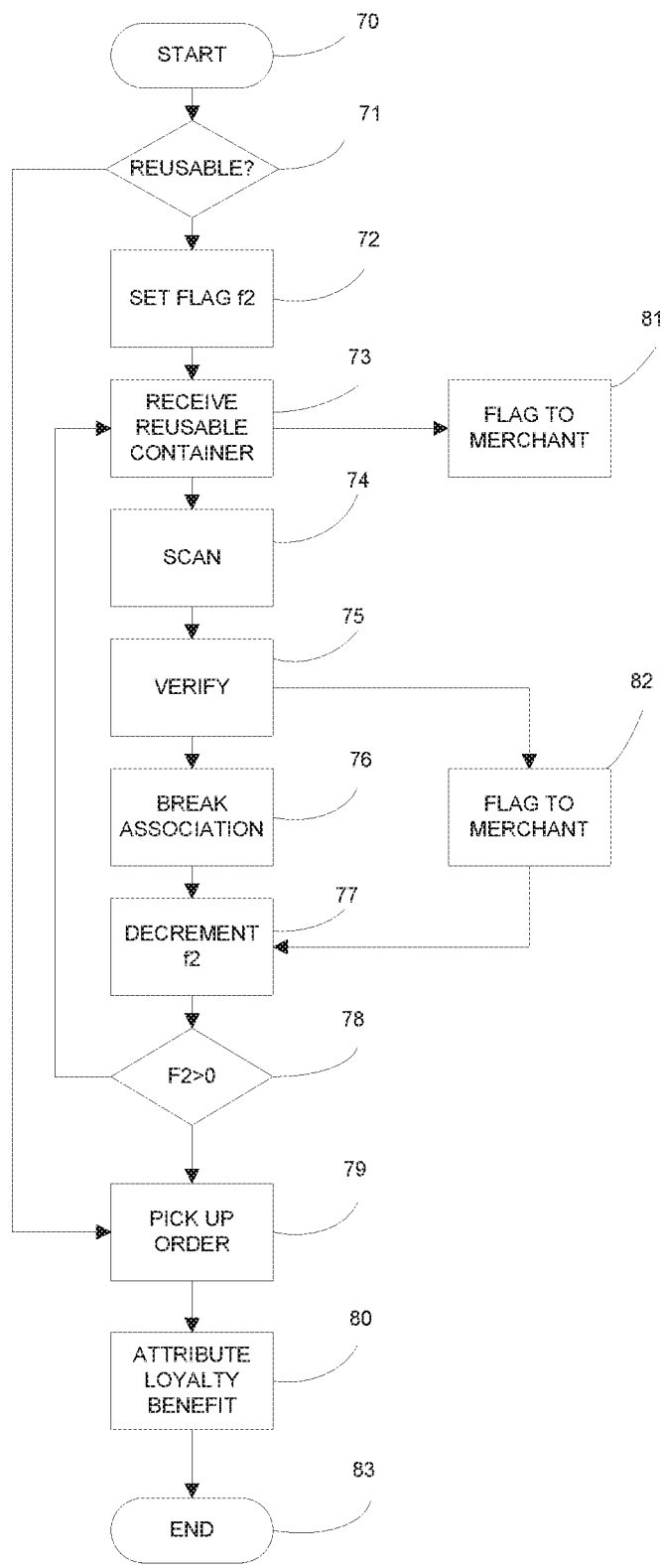
FIG. 3C is a flowchart depicting steps for a third part of a mobile order process for goods fulfilled with a reusable container performed when a customer picks up a mobile order from a merchant.

Turning to FIGS. 3A-3C, flow charts showing the steps of a mobile transaction where use of a reusable container is incentivized with a loyalty program are depicted. Some listed steps are performed by a mobile computing device used to place a mobile order. It should be noted that FIGS. 3A-3C show one arrangement of steps that can be used for placing and fulfilling mobile orders with reusable containers. However, other arrangements of steps are possible and this particular arrangement is not limiting. It should also be noted here that these same steps apply for a mobile order placed where the merchant delivers goods to the customer, rather than when the customer picks up goods as described above. The only difference is that any steps performed when the customer is picking up the order at the merchant location will instead be performed at the customer location where the goods are delivered.

In FIG. 3A, a customer initiates a transaction at start 50. At step 51, the customer opens up a mobile software application provided by the merchant on a computing device such as a mobile smart phone (but may be any known type of computing device as described earlier) owned or controlled by the customer. The application consists of instructions stored in memory on the computing device. A processor on the computing device executes the instructions to perform desired operations. At step 56, the application checks if the order is complete (this step may be skipped when the application is first opened as no items have been selected). At step 52, the customer selects an item he wishes to order. At step 53, the customer selects how the item selected in step 52 should be fulfilled. In one non-limiting example, the application only displays fulfillment options for items when those options are available. In one non-limiting example, an option to select fulfillment in a reusable container may only be shown for certain items offered by the merchant. Alternatively or additionally, an option to select fulfillment in a reusable container may only be shown if the customer has at least one suitable reusable container associated with him. In one non-limiting example, for a customer having a certain number of associated reusable containers, once a customer has selected a number of items to be fulfilled with reusable containers equal to the number of reusable containers associated with the customer, the mobile application will inform the customer that any additional items ordered with reusable containers may require a fee to associating a new reusable container with the customer.

If at step 53 fulfillment using a disposable container is selected for an item, that item is added to the customer order shopping cart at step 55 and operation returns to step 56. At step 56, if the customer is done selecting items and the order is complete, the process jumps to step 57. Otherwise, the process proceeds to step 52 where another item can be selected. If at step 53 the customer selects a reusable container for fulfillment, that item is flagged at step 54 and a flag f1 is incremented by 1 (flag f1 has an initial value of zero when the application is first opened and no items have been selected). The selected item is then added to the shopping cart at step 55. This selection process continues until the customer informs the application item selection is complete (for example, by selecting a "Proceed to Checkout" option shown to the customer by the application). When item selection is complete, the process continues at step 57.

At step 57, the application checks to see if any items in the order were selected to be fulfilled with reusable containers. If no items were selected to be used with reusable containers, the transaction proceeds to step 63 where the shopping cart is checked out, the order is confirmed and paid for and order information is transmitted to the merchant. The order information includes order items and fulfillment method as well as other standard mobile transaction data as required (where fulfillment information can include whether reusable or disposable containers are used, sizes of containers, and which order items have which type of container). Any loyalty program benefits the transaction qualifies for, other than use of reusable containers, are earned and recorded at the time the transaction payment is received by the merchant. Loyalty program benefits for use of reusable containers are earned when the customer provides the specified number of used reusable containers back to the merchant at a later step.

If at least one item was selected to be fulfilled with a reusable container, the application proceeds to scan step 58. At step 58, the application asks the customer to scan reusable containers in the customer's possession, to match up with the items flagged to use reusable containers in step 54. In one non-limiting example, the mobile application opens up an optical scanning application using the mobile computing device's built in camera and loads associated scan software into memory of the mobile computing device to run on the mobile computing device processor, to perform optical scans of unique identifying information located on reusable containers. The scan software analyzes an image taken by the device camera of a label affixed to the reusable container with an image-based code printed on it, to determine the unique identifying information associated with the reusable container. If a different method is used to incorporate unique identifying information into the reusable container, a different scanning technology may be required. It is preferable to use scanning technology that is compatible with standard smartphones and tablets, as these devices will be used for the majority of mobile orders. Such devices are typically equipped with cameras, and NFC and Bluetooth communication technology which could be used to scan information from the reusable containers. Examples disclosed herein are not limited to these methods and any commonly available scanning and communication method can be used.

At step 59 unique identifying information obtained during the scan step 58 is compared with stored information about reusable containers maintained by the merchant. The application may query a remote database that stores information regarding unique identifying information for reusable containers, or the application may check information stored within the application running on the customer's computing device. If the identifying information obtained from the scan matches stored information regarding reusable containers usable by the merchant, the application has verified that the customer has a compatible reusable container in their immediate possession. A compatible reusable container is a reusable container the merchant has determined it can accept and use in their operation. If the identifying information does not match, the customer is informed that the reusable container is not compatible, flag f1 is not decremented and the transaction proceeds to step 65 and continues as before.

In step 60 the application verifies if a scanned reusable container is associated with the current customer. If it is, once the transaction is complete the use of this reusable container is reported to the merchant loyalty program so the customer can earn benefits offered its use. If a scanned reusable container is not associated with the current customer, this will be flagged at step 67 and the customer will be directed to address the issue with the merchant when they pick up their order. Otherwise, benefits may accrue to the customer to whom the reusable container is associated, rather than the current customer. The transaction then proceeds to step 61 and continues as before.

If a reusable container is associated with someone other than the current customer, the issue will be flagged and the customer will be instructed to address the matter with a clerk at the merchant location when picking up their order, so that benefits in the loyalty program can be properly tracked and gift dollar balances can be protected against loss and theft. If any gift dollars are associated with the reusable container, the current customer should not have access to those gift dollars (unless the customer that is currently associated with the reusable container grants their permission).

To address an association with an incorrect customer, the current association could be left unchanged and benefits for using this reusable container attributed to the customer the container is currently associated with. Alternatively, the association could be changed to the current customer for the purposes of this transaction only, depending on how the merchant wishes to handle such conditions. A separate notification can be sent to the customer the reusable container is associated with to notify that customer that a container associated with them was used in a transaction with a different customer, and that customer can contact the merchant if there is an issue that needs to be corrected.

If no customer is currently associated with the reusable container, the issue is flagged and the customer is instructed to address the matter with the merchant when picking up their order, so benefits in the loyalty program are properly tracked and gift dollar balances are protected against loss and theft. If any gift dollars are associated with this reusable container, it is assumed it is configured as a gift card and gift dollars can be used by any customer, until such a time as this reusable container is associated with a specific customer. Association information is reviewed at checkout 63 when payment is made so gift dollars can only be used by a customer authorized to use them.

While it is not strictly necessary for a reusable container to be associated with a customer, keeping track of associations between reusable containers and customers allows a merchant to track additional data about customer behavior, and also facilitates and protects use of reusable containers as gift cards. Once a reusable container is associated with a particular customer, gift dollars associated with that reusable container will only be accessible by that customer, which adds protection against theft or loss. The gift balance can be tracked in a customer account, so the gift dollars are not lost if the reusable container is lost or stolen, or if identifying information becomes unreadable.

Once a reusable container has been verified, at step 61 flag f1 is decremented by 1. At step 62, the value of flag f1 is tested to see if it is greater than zero. If f1 is greater than zero, additional reusable containers need to be scanned. The scanning process proceeds to step 65 where the customer is asked if scanning is complete. It is possible that the customer may have selected more items for fulfillment in reusable containers that he has in his possession. If the customer has no more reusable containers to scan, the customer answers yes and the process move to step 66 where the customer is asked to modify their order. If the customer answers no, the scanning process continues at step 58.

Modification of the order involves either changing one or more item fulfillment selections at step 68 from reusable to disposable containers as needed or involves the customer agreeing at step 69 that the merchant can add a new reusable container to the order for which the customer may be charged a fee. If the customer changes fulfillment selections, the value of f1 will be modified according to the changed selections. The transaction then proceeds to step 62 where the value of f1 is tested, and the transaction proceeds as before. If the customer elects to use an additional new reusable container, the application will charge any necessary fees, the transaction proceeds to step 61 where flag f1 is decremented and the transaction proceed from step 61 as before.

If scanning is not complete and there are additional reusable containers to scan, the process returns to scan step 58 and the scan process is repeated. Once the number of reusable containers scanned matches the number of items flagged for use with reusable containers in step 54 (which may be modified in step 68), the scanning process completes as the value of flag f1 will be equal to zero. The order process proceeds to checkout step 63 where the shopping cart is checked out, the order is confirmed and paid for and order information is transmitted to the merchant, where the order information includes order items and fulfillment method as well as other standard mobile transaction data as required (where fulfillment information can include whether reusable or disposable containers are used, sizes of containers, and which order items have which type of container). Payment can be made by whatever method merchant 10 accepts, including using gift dollars associated with the reusable container (if authorized, as described earlier). Then this ordering portion of the mobile transaction ends at step 64.

FIG. 3B depicts a flowchart for the merchant side of the mobile transaction initiated by the customer in FIG. 3A. It should be noted that there are many steps in mobile order processing that are not shown here. The examples disclosed herein are concerned with aspects of the order process that are affected by use of a reusable container. Other aspects such as product inventory management, scheduling of order fulfillment, payment methods, etc. are well known and are understood to occur as part of existing mobile ordering platforms and will not be described in detail here.

The merchant portion of the mobile order process starts at step 80. At step 81, the mobile order placed by the customer at checkout 63 is received by the merchant. At step 82, the merchant identifies whether or not and how many reusable containers are required. This information is transmitted to the merchant as part of the order. If no reusable containers are used, the transaction proceeds to step 86 where the order is filled according to the merchant's normal order fulfillment process using disposable containers. If the order requires use of one or more reusable containers, the transaction proceeds to step 83. At step 83, the merchant retrieves the required number of replacement reusable containers from inventory (stock 11) and the transaction proceeds to step 84. At step 84, the replacement reusable containers are scanned. At step 85, unique identifying information included with the replacement reusable containers obtained during scan step 84 is associated with the customer. At step 86, the order is filled using the fulfillment selections made by the customer during the ordering process descried earlier (including use of replacement reusable containers as needed). At step 87, the order is marked as filled and is placed in a location for customer pickup (or for delivery to the customer as described below). It should be noted again that the mobile transaction being described here assumes the customer travels to a merchant location to pick up his fulfilled order. However, the process described could also accommodate delivery of goods to a customer. The examples disclosed herein are contemplated to work with mobile orders that are delivered to a customer location, as well as mobile orders picked up by the customer at the merchant location. The merchant portion of the mobile transaction ends at step 88.

FIG. 3C depicts the steps that occur during the final portion of the mobile transaction when a customer arrives at the merchant location to pick up their mobile order. It should be noted that these same steps would also apply if the merchant delivered the mobile order to a customer location.

The pickup portion of the transaction starts at step 70. At step 71, if a reusable container is not involved, the transaction proceeds to step 79 where the customer picks up their order. At step 80, since there are no reusable containers used, there are no loyalty program benefits to attribute here (other transaction related loyalty program benefits were attributed at checkout 63). The transaction ends at step 83. At step 71, if a reusable container is involved the transaction proceeds to step 72. At step 72, a flag f2 is set to a value equal to the number of reusable containers the merchant used to fulfill the customer order. At step 73, the customer returns a used reusable container to the merchant. At step 74, the merchant scans the reusable container provided by the customer. Because these containers have previously been scanned by the customer as part of the mobile order process, the unique identification information from each reusable container scanned will already be associated with the transaction. At step 75 the POS system 19 identifies the order and verifies that the reusable container being returned is one of the reusable containers scanned by the customer when placing the mobile order. If the returned reusable container matches, the transaction proceeds to step 76. If the verification fails, the issue is flagged for the merchant to resolve as an exception, the reusable container is set aside, flag f2 is decremented at step 77 and the process continues to step 78

At step 76, the association of the returned reusable container with the customer is broken. While this is shown as a separate step, it may occur immediately upon verifying that an expected reusable container has been returned. At step 77, flag f2 is decremented. At step 78, the value of flag f2 is tested. If the value of f2 is greater than zero, additional containers need to be scanned and the process cycles back to step 73 and proceeds as before. If f2 is equal to zero, all expected used reusable containers have been received from the customer and the process continues to step 79 where the customer picks up their order. At step 80, any earned loyalty program benefits offered by the merchant for use of reusable containers applicable to this transaction are attributed to the customer, and the customer's loyalty account is updated accordingly. The transactions ends at step 83.

Returning to step 73, if flag f2 is greater than zero and the customer does not have any further used reusable containers to be scanned, the issue is flagged at step 81 so it can be resolved by the merchant as an exception. If the customer is unable to produce the required reusable containers, the customer may be charged a fee for each missing reusable container. The merchant is free to determine what penalties, if any, it wishes to implement for the case where the customer fails to provide required reusable containers. If a reusable container scanned by the customer as part of the mobile order is not returned, no benefit for use of that reusable container will be attributed to the transaction.

A combined loyalty program is one in which merchants associated with more than one corporate entity participate together in some manner. In one non-limiting example, merchants from separate corporate entities participate together in a "combined" loyalty program that incentivizes use of reusable containers. A combined program allows reusable containers to be used with merchant locations from all participating corporate entities. The nature of the cooperation may be simple or complex. In a simple combined loyalty program, a re-usable container is usable with merchants associated with different corporate entities, and use of the reusable container can earn benefits in multiple corporate entity loyalty programs. Rewards and transactions are tracked by each corporate entity in their individual loyalty programs, the only difference being they allow reusable containers to be used across corporate entities. Each program can alter their own loyalty program benefits and rewards as they see fit. Transactions (both in store and mobile) operate as described earlier with respect to one merchant.

Participating merchants may accept reusable containers in a return originally provided by merchants associated with different participating corporate entities. For example, a reusable cup obtained from a Starbucks location may be returned to a McDonalds location as part of another transaction. To accomplish this, some standardization in reusable containers is needed (for example, sizes of reusable cups offered may be standardized across corporations).

In one non-limiting example, a reusable container used as part of a combined loyalty program allows a single reusable cup to be re-used at whatever participating location a customer wishes to visit and avoids the need for the customer to possess and use separate reusable cups provided by each corporate entity to earn benefits in each company's loyalty program. A single reusable container can be used and tracked by each participating entity in the combined program.

The unique identifying information of the reusable container presented at the time of purchase is scanned and provided to the entity's loyalty program when a purchase is made. In a simple combined loyalty program, each entity maintains control over its own loyalty program. Benefits earned in one entity's program only earn rewards provided by that entity. A combined loyalty program is discussed in more detail below.

Corporate entities may use marketing information such as company logos on reusable containers such as cups, bags and the like. Merchants will not want to fulfill orders using reusable containers that might be printed with a competitor's marketing information. A Starbucks location would not want to fulfill an order for a beverage in a cup printed with a McDonalds logo, and vice versa.

In one non-limiting example, reusable containers are swapped by merchants. Any reusable container from any participating entity is accepted at any location, but each entity only fulfills orders using reusable containers having their own marketing information. Each location receives used reusable containers from customers and provides the customer a replacement reusable container, as described earlier. Merchants then participate in some form of exchange system. In one non-limiting example, as part of such an exchange system merchants ship received, used reusable containers to a remote reprocessing center where they are washed/cleaned, inspected, sorted, and returned to facilities associated with the various participating corporate entities. This centralized system is described in more detail with respect to FIG. 4. In one non-limiting example, individual merchants could reprocess received, used reusable containers and then locally swap the reusable containers amongst themselves.

Rather than sorting and exchanging reusable containers printed with the marketing information of particular corporate entities, the reusable container incorporates a structure for providing changeable marketing information. Any known structure allowing for changing marketing information is contemplated herein. In one non-limiting example, a changeable element is incorporated into the reusable container. The changeable element may involve changing data that is displayed on an electronic display. In one non-limiting example, the marketing information is incorporated onto a separate replaceable marketing card which is removably coupled to the reusable container. Use of changeable marketing information such as a replaceable marketing card removes the need to tie individual reusable containers to particular corporate entities. The marketing information cards could be exchanged between merchants directly if desired, or via a 3rd party exchange system. This is described in more detail shortly.

Figure 4:
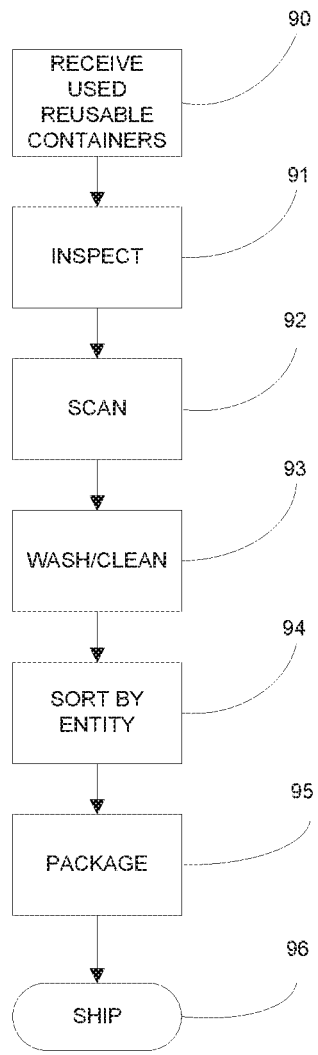
FIG. 4 is a flowchart depicting steps performed by a remote $3^{rd}$ party reusable container reprocessing facility.

Depicted in FIG. 4 is a flowchart for reprocessing reusable containers in a remote reprocessing facility. At step 90, used reusable containers are received from various program participants. For operation only with a single company's loyalty program, all of the reusable containers are used by merchants associated with a single corporate entity, all reusable containers will have marketing information associated with only the one corporate entity and no sorting is required. For operation with a combined loyalty program, used reusable containers may be received from any participating corporate entity. At step 91, the received reusable containers are inspected for damage and any damaged units are removed from the stream and repaired, recycled, or disposed of as needed. At step 92, units that pass inspection are scanned to make sure their unique identifying information is readable. Though not shown, at this step, computing systems in place at the remote facility could communicate with participating loyalty program servers and request that customer associations be broken if they still exist. If the unique identifying information is not readable, a unit may receive a new label printed with new unique identifying information, or memory that stores unique identifying information could be rewritten at this step. In step 93, units that pass inspection and scanning are reprocessed as needed (washed/cleaned). In step 94, units are sorted by participating corporate entity. For example, all Starbucks, McDonalds and Dunkin Donuts reusable containers separated from each other. In step 95, reprocessed reusable containers are packaged for shipping. The packaging should effectively seal units so that they are ready for use at merchant locations. In step 96, the reprocessed and sorted reusable containers are shipped to participating corporate entity facilities. Reprocessed units could be shipped to distribution centers where they are placed in inventory along with new units the company may also own, for subsequent shipping to individual merchant locations as needed. Alternatively, the remote reprocessing facility may ship reprocessed reusable containers directly to individual merchant locations.

Figure 5A:
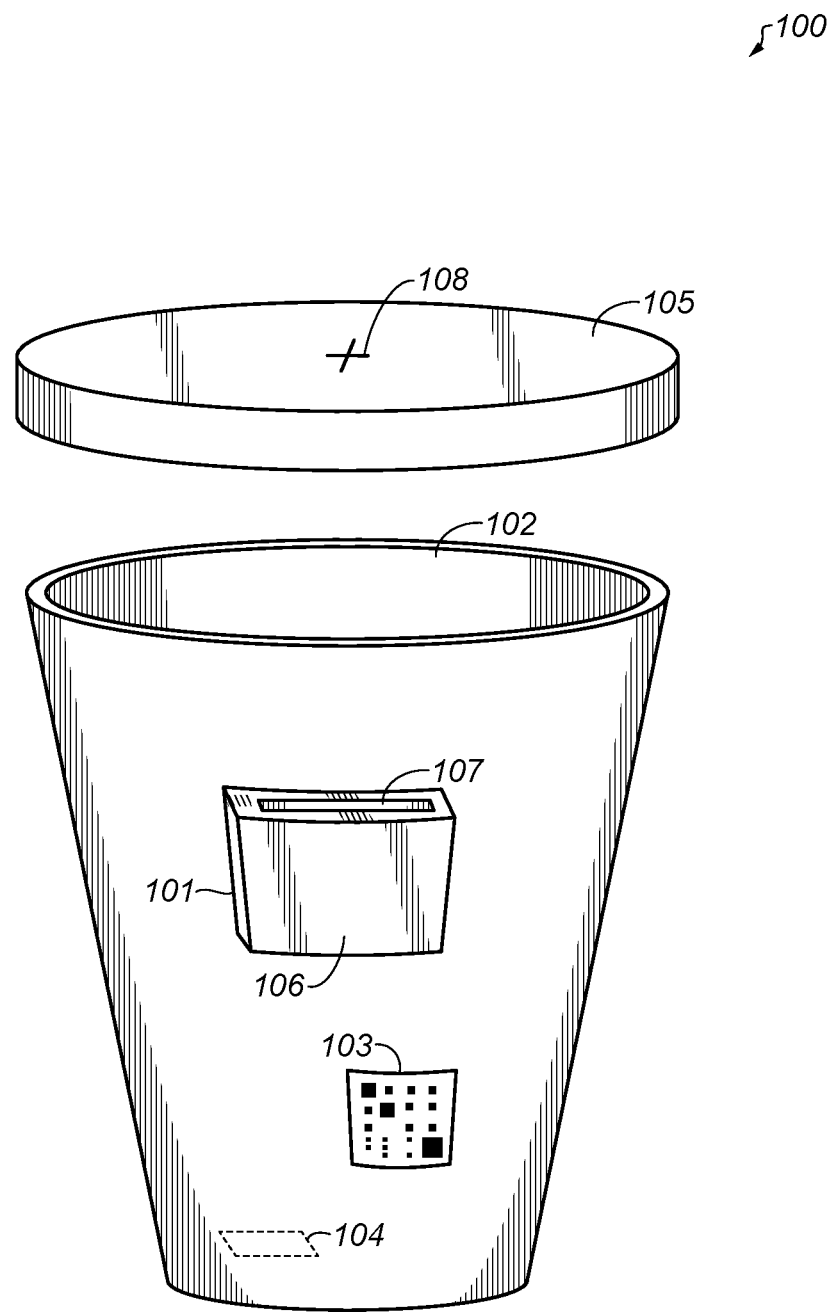
FIG. 5A depicts an example reusable container.
Figure 5B:
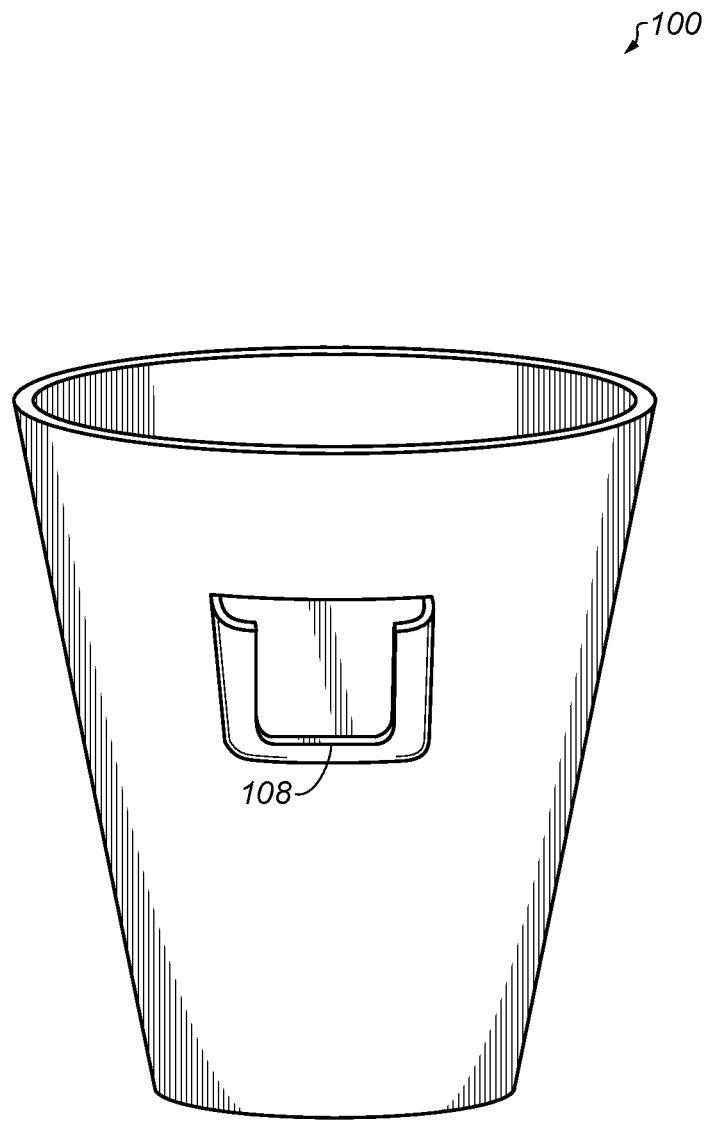
FIG. 5B depicts an example reusable container.
Figure 5C:
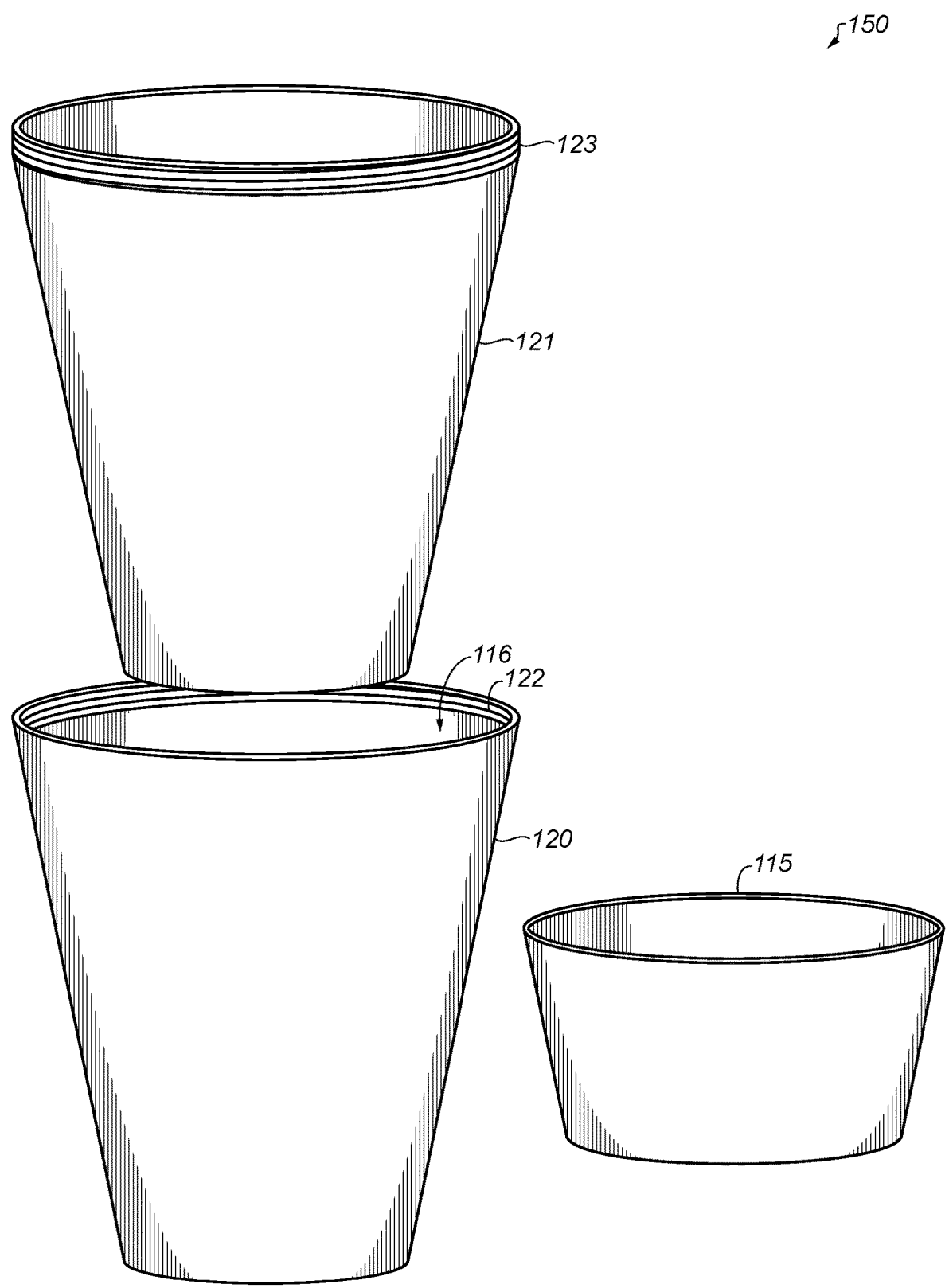
FIG. 5C depicts an example reusable container.

In one non-limiting example depicted in FIGS. 5A-5C, a reusable container provides an area on the container for removable/replaceable marketing information. The marketing information can be directed to the to specific corporate entities participating in the combined loyalty program, to the combined loyalty program itself, or other uses. Since the intent is to have reusable containers used for an extended period of time, having changeable marketing information allows companies to change their marketing message, company identifying marks such as logos, etc., without having to replace their existing plant of reusable containers.

FIG. 5A depicts reusable container 100 as a cup, but it should be understood that other reusable containers such as boxes, bags and the like may similarly incorporate an apparatus for changing marketing information, such as incorporating removable/replaceable marketing materials. Reusable container 100 may be insulated for use with hot beverages or may be arranged to be usable with cold beverages. Reusable containers have a compartment for accepting goods and are washable or cleanable so they can be used multiple times without risk of contamination. Reusable container 100 is constructed and arranged so that marketing and identifying information is not damaged when the reusable containers are washed/cleaned.

Reusable container 100 includes goods storage compartment 102 which in the example depicted is a bounded volume suitable for storage of liquids. Reusable container 100 may have lid 105 to close off the bounded volume so liquids can be transported without spilling. Lid 105 may have perforation 108 for accepting a straw or may have a slide, flap, simple hole or other feature (not shown) that can be opened and closed to allow a beverage to be poured out or sipped by a customer, as is well known.

Marketing card compartment 101 is coupled to an exterior surface of reusable container 100 and is constructed and arranged to removably receive a marketing card having marketing information printed thereupon. The compartment can be as large or as small as desired. It can extend around the entire perimeter of the reusable container, or just a portion as shown. More than one compartment can be used with more than one marketing card. Marketing card 110 is described in more detail with reference to FIG. 6. Marketing card 110 has marketing information printed thereupon and is removably received in marketing compartment 101. In one non-limiting example, marketing compartment 101 may be almost fully sealed except for slot 107 through which marketing card 110 is inserted and removed. The external wall 106 of marketing compartment 101 should not block viewing of the printed area of marketing card 110 when it is inserted into marketing compartment 101, so that the marketing information is viewable by customers. In one non-limiting example, external wall 106 is transparent so the printed information on marketing card 110 is viewable through external wall 106.

Label 103 is affixed to an external surface of reusable container 100 so it is easily scannable. Label 103 is shown attached to a side outer wall of cup 100, but label 103 could be affixed to any surface of cup 100 that can be scanned, including the top or bottom surfaces. Label 103 contains unique identifying information for the reusable container, which in this example is coded into a 2-dimensional image printed on label 103. The 2-dimensional image is scannable by the merchant using existing optical scanning technology such camera, LED or laser based optical scanners. The 2-dimensional image is also scannable by typical mobile computing devices that would be possessed by a customer, such as a smartphone with an integral camera. Label 103 can be adhesively attached to an exterior wall of a reusable container, sewn into an exterior wall, or otherwise mechanically attached to the reusable container 100.

Optionally, reusable container 100 may include memory device 104. If memory device 104 is included, label 103 can be eliminated. Memory device 104 can be any known memory device, where the contents of the memory device can be read from and written to by devices located external to reusable container 100. Memory device 104 stores the unique identifying information associated with the reusable container. Memory device 104 allows a merchant or reprocessing center to easily change the unique identifying information if desired. For example, rather than breaking an association of old unique identifying information with a customer, the unique identifying information can be re-written so that the old number no longer exists and there is no need to update a loyalty program to break associations.

FIG. 5B depicts an alternative construction for a marketing compartment. In this non-limiting example, a raised ridge 108 is formed on an outer wall of reusable container 100 to hold marketing card 110 around its perimeter.

In one non-limiting example depicted in FIG. 5C, reusable container 150 is formed from two sections, outer wall section 120 and inner wall section 121. When outer wall section 120 is coupled to inner wall section 121, marketing compartment 116 for holding a marketing card is formed therebetween. Inner and outer wall sections 120 and 121 can be formed to produce a wide variety of possible shapes for marketing compartment 116. Compartment 116 can extent around the entire perimeter of reusable container 150 or can be limited to just a portion of the perimeter. Separate compartments can be formed as well. The height of the compartments can be varied as desired. Marketing card 115 is similar to marketing card 110 of FIG. 6 but in FIG. 5C marketing card 115 is depicted as having a generally cylindrical or truncated conical shape. Typically, marketing card 115 will be printed on the flat and is bent as needed during insertion into compartment 116. Alternatively, marketing card 116 can be separately formed into a desired shape. At least a portion of outer wall 120 should be transparent so that information printed on marketing card 115 is visible. In one non-limiting example, the entire outer wall 120 is transparent.

Inner wall section 121 and outer wall section 120 should be removably attached to each other, so that marketing card 115 can be removed and replaced when needed. Inner and outer wall sections should be separable and attachable by a merchant or a remote reprocessing facility as part of a reprocessing operation so that marketing cards can be swapped as part of reprocessing. Any known reusable mechanical attachment method for attaching inner and outer wall sections such as compatible threads 122 and 123 on outer and inner wall rims as shown, or snap fits, twist locks, clasps, or any other known mechanical multi-use joining mechanism are contemplated herein, and example reusable containers disclosed are not limited to use of any particular joining mechanism. In one non-limiting example, a simple key mechanism is used that is easy for a merchant or a remote reprocessing center to use to separate the sections but makes it more difficult for a customer to do so, to reduce potential loss of marketing cards.

Use of a removable marketing card containing marketing information allows a sorting operation to be eliminated that would typically be performed at either a remote reprocessing facility or at individual merchant locations. Marketing cards can be removed prior to reprocessing (whether done at a remote facility or locally by the merchant). Merchants separately could exchange marketing cards among themselves. Alternatively, a remote reprocessing facility could swap marketing cards as needed to match with current orders for reprocessed reusable containers. Reusable containers can also be reprocessed with marketing cards in place and sorted as part of reprocessing.

Use of removable marketing cards allows a merchant to locally reprocess reusable containers rather than reprocessing them in a remote facility. The merchant can reprocess reusable containers in-line or in bulk on site once a sufficient number of used reusable containers have been received. Marketing cards are swapped out as needed when fulfilling an order, or during bulk reprocessing.

Figure 6:
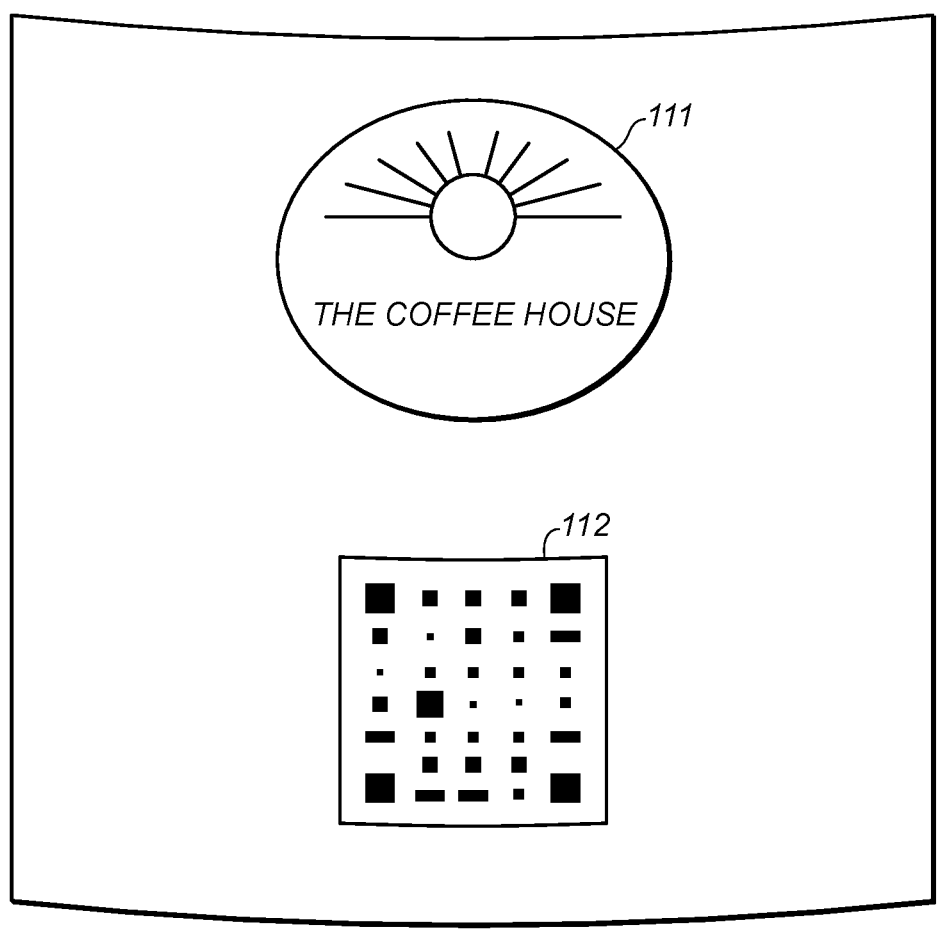
FIG. 6 depicts an example replaceable marketing card usable with a reusable container.

FIG. 6 depicts example marketing card 110 for use in a reusable container. Examples are not limited in the information that may be printed on a marketing card. Marketing card 110 incorporates corporate logo 111. Other marketing information could also be included. For example, a 2D code such as a QR code could also be printed on card 110. 2D code 112 is shown printed under the corporate logo. This 2D code can be used as desired by the company for further marketing efforts, such as directing a customer to a specified merchant controlled URL.

The marketing card should be environmentally robust to last through multiple reprocessing cycles, or it should reside in a compartment that is protected during wash operation steps of reprocessing. Having marketing materials disposed of each time a reusable container is reprocessed would defeat some of the benefits of using reusable containers. In one non-limiting example, the marketing card is plastic laminated to protect it from damage. In one non-limiting example, the marketing card is formed from plastic sheet that can be directly printed on. In the example of FIG. 5C, compartment 116 is sealed to protect marketing card 115.

A complex combined loyalty program can track use of a single reusable container across locations associated with multiple corporate entities, where the benefits earned at different locations can be combined. A benefit can be earned from any qualifying transaction at any participating establishment. Additionally, the benefits earned can be used towards rewards offered by any participating entity. Customers can qualify for rewards more quickly. Customers can redeem benefits for different reward offers made available by different participating entities. For example, a customer might earn enough benefits by making transactions with re-usable containers in merchants associated with 3 different corporate entities to qualify for a particular reward from one establishment of their choosing much sooner than would otherwise be possible.

A complex combined loyalty program allows participating corporate entities access to a wider population of customers. For example, Starbucks can reach Dunkin Donuts customers, and vice versa. This both increases reach and lowers costs to reach these customers.

For a complex combined loyalty program, a separate centralized database may be formed. This system communicates with individual company loyalty systems. In one non-limiting example, a customer that obtains a global customer account is automatically enrolled in each participating company's loyalty program. Associations of a reusable container with that customer are communicated to all participating loyalty programs. The centralized system maintains records of all qualifying transactions at all participating corporate entity locations. Associations between customers and reusable containers are made and broken as before, but this is done centrally. In one non-limiting example, a system could require the customer to select which loyalty programs to participate in.

Once the loyalty programs are linked, then the function of making and breaking associations between reusable containers and customers becomes easier. As soon as a customer swaps a used reusable container for a replacement reusable container at a merchant location, that information is communicated to a central server. The central server can then inform each individual loyalty program system that the customer should no longer be associated with the old reusable container and should now be associated with the replacement reusable container.

In one non-limiting example, associations are maintained in a central database maintained on a central server. Individual loyalty programs query and communicate with the central server as part of transactions, to obtain association data and to inform the central system what associations should be made or broken. Maintaining a central database of associations helps reduce the chances that individual loyalty program association databases are not properly synchronized and benefits for use of reusable containers is incorrectly attributed.

A number of implementations have been described. Processes have been described showing steps of the process in specific order. Nevertheless, it will be understood that additional modifications may be made including changing the order of steps shown without departing from the scope of the inventive concepts described herein, and, accordingly, other embodiments are within the scope of the following claims.

What is claimed is:

1. A method for conducting a mobile transaction between a user and a merchant using reusable containers comprising:
   providing, by a mobile computing device operated by a user located remotely from a location of the merchant, a listing of items that can be ordered from the merchant by the user,
   placing by the user an order with the merchant for a selection of the listed items via the mobile computing device,
   verifying by the mobile computing device that one or more reusable containers are in the possession of the user at the time the order is placed, wherein the verification comprises scanning the one or more reusable containers with the mobile computing device,
   indicating to the merchant via the mobile computing device the number of reusable containers verified to be in the possession of the user at the time of ordering; and
   fulfilling the order by the merchant using replacement reusable containers, wherein the number of replacement reusable containers used to fulfill the order is equal to or exceeds the number of reusable containers verified to be in the possession of the user by the mobile computing device at the time the order was placed by the user.

2. The method of claim 1 wherein the order is fulfilled by the merchant prior to the user arriving at the merchant location to retrieve the order.

3. The method of claim 2 further comprising the steps of:
retrieving by the merchant from the user the reusable containers verified to be in the possession of the user,
verifying by the merchant that the number of reusable containers retrieved from the user matches the number of reusable containers verified to be in the possession of the user at the time the order was placed, and;
retrieving by the user the order fulfilled by the merchant.

4. The method of claim 1 further comprising the steps of:
attributing by the merchant to the user a benefit in a loyalty program, wherein the benefit is associated with the use of the one or more reusable containers in the transaction.

5. The method of claim 1 further comprising the step of:
delivering the order to a remote customer location by a delivery provider.

6. The method of claim 5 wherein delivering the order further comprises:
retrieving by the delivery provider from the user the reusable containers,
verifying by the delivery provider that the number of reusable containers retrieved from the user matches the number of reusable containers verified to be in the possession of the user at the time the order was placed, and;
providing to the user by the delivery provider the order fulfilled by the merchant.

7. The method of claim 5 further comprising the steps of:
attributing by the first merchant to a customer a benefit in a loyalty program, wherein the benefit is associated with the use of the one or more reusable containers in the transaction.

8. The method of claim 1 wherein placing the order further comprises identifying by the user which items of the order should be fulfilled by the merchant using a reusable container.

9. The method of claim 3 wherein if the number of reusable containers retrieved from the user does not match the number of reusable containers verified to be in the possession of the user at the time the order was placed, the merchant is notified of the mismatch and the transaction is not completed.

10. The method of claim 9 wherein if the number of retrieved reusable containers is less than the number of reusable containers verified to be in the possession of the user at the time the order was placed, the user is provided one or more options to address the discrepancy.

11. The method of claim 10 wherein one of the options is to be charged a fee to compensate the merchant for supplying more reusable containers than are received from the user.

12. The method of claim 1 wherein placing the order comprises identifying by the user whether a specific selected item should be fulfilled by the merchant with a reusable container.

13. The method of claim 12 wherein if the number of specific items selected exceeds the number of reusable containers verified to be in the possession of the user, the user is prompted to update the specific items selected.

14. The method of claim 12 wherein if the number of specific items selected exceeds the number of reusable containers verified to be in the possession of the user, the user is prompted that an additional fee may be required to fulfill the order according to the user's selection.

15. The method of claim 12 wherein an option to select an item to be fulfilled in a reusable container is only provided to the user if the merchant has that option available.

* * * * *